United States Patent

Ohara

(10) Patent No.: US 9,137,436 B2
(45) Date of Patent: Sep. 15, 2015

(54) IMAGING APPARATUS AND METHOD WITH FOCUS DETECTION AND ADJUSTMENT

(71) Applicant: CANON KABUSHIKI KAISHA, Tokyo (JP)

(72) Inventor: Naoyuki Ohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/158,679

(22) Filed: Jan. 17, 2014

(65) Prior Publication Data

US 2014/0204241 A1 Jul. 24, 2014

(30) Foreign Application Priority Data

Jan. 23, 2013 (JP) .................................. 2013-010206
Nov. 1, 2013 (JP) .................................. 2013-228322

(51) Int. Cl.
*H04N 5/232* (2006.01)
*G03B 13/00* (2006.01)
*H04N 5/243* (2006.01)

(52) U.S. Cl.
CPC ........... *H04N 5/23212* (2013.01); *H04N 5/243* (2013.01)

(58) Field of Classification Search
CPC ....... H04N 5/243; H04N 5/23212; G02B 7/28
USPC ........... 348/222.1, 223.1, 241, 340, 345, 349, 348/353; 396/89, 121, 124
See application file for complete search history.

(56) References Cited

U.S. PATENT DOCUMENTS

| 2001/0036361 | A1 | 11/2001 | Suda |
| 2008/0317454 | A1* | 12/2008 | Onuki ........................... 396/128 |
| 2009/0213255 | A1* | 8/2009 | Suzuki .......................... 348/302 |
| 2012/0033128 | A1 | 2/2012 | Nagano |
| 2013/0088621 | A1* | 4/2013 | Hamada ........................ 348/281 |

FOREIGN PATENT DOCUMENTS

| JP | 2001-305415 A | 10/2001 |
| JP | 2010-271419 A | 12/2010 |

* cited by examiner

*Primary Examiner* — Lin Ye
*Assistant Examiner* — Chriss Yoder, III
(74) *Attorney, Agent, or Firm* — Canon USA, Inc., IP Division

(57) ABSTRACT

An imaging apparatus performs a focus detecting operation with an image sensor including a photoelectric conversion portion that has a pupil-dividing function. The imaging apparatus increases a line addition number according to a target exposure value corresponding to a pixel dynamic range that is variable depending on an exposure setting value. Thus, the imaging apparatus can reduce the amount of noise and can suppress the dispersion of focus detection result. Further, the imaging apparatus changes the line addition number according to a lens diaphragm aperture size, a defocus amount, or a pixel signal reading mode. Thus, the imaging apparatus can secure the resolution in the vertical direction and can prevent the detection accuracy from deteriorating even in a case where a photographic subject is obliquely positioned in a focus detection area.

11 Claims, 14 Drawing Sheets

IMAGING APPARATUS AND METHOD WITH FOCUS DETECTION AND ADJUSTMENT

BACKGROUND OF THE INVENTION

1. Field of the Invention

The present invention relates to an imaging apparatus, such as a digital camera or a video camera.

2. Description of the Related Art

A phase difference detection based auto focus (AF) (hereinafter, referred to as "phase difference AF") system is employable for an imaging apparatus (e.g., a camera). The phase difference AF imaging apparatus halves the light flux having passed through an exit pupil of a photographic lens and causes a pair of focus detection sensors to receive halved light fluxes. Then, the imaging apparatus obtains a deviation of the photographic lens from an in-focus position (hereinafter, referred to as a defocus amount) by detecting a shift amount between signals output based on the light-receiving amounts, more specifically, by detecting a relative shift amount between the output signals in a light flux division direction (hereinafter, referred to as "image shift amount").

As discussed in Japanese Patent Application Laid-Open No. 2001-305415, it is conventionally known to configure an image sensor to have a phase difference detection function to realize high-speed phase difference AF processing without using a dedicated focus detection sensor. According to the configuration discussed in Japanese Patent Application Laid-Open No. 2001-305415, the image sensor includes a pixel whose photoelectric conversion portion is substantially halved to realize a pupil-dividing function. The image sensor performs focus detection processing by individually processing the outputs to be obtained from the halved photoelectric conversion portions and uses a summed-up output of the halved photoelectric conversion portions as an image signal.

Further, as discussed in Japanese Patent Application Laid-Open No. 2010-271419, it is conventionally known to employ a configuration capable of reducing the influence of noise when a photographic subject is dark in a focus detection using the photoelectric conversion portion having the pupil-dividing function. The configuration discussed in Japanese Patent Application Laid-Open No. 2010-271419 includes detecting the brightness for each line of an image sensor and adding a line if the detected brightness is lower than a predetermined value.

However, according to the configuration discussed in Japanese Patent Application Laid-Open No. 2001-305415, the image sensor is required to realize a focus detection function and an imaging function simultaneously. Therefore, if only the shooting conditions are taken into consideration in determining an exposure setting value to control the image sensor, the setting value may be inappropriate for the focus detection. Further, in a case where an operator arbitrarily switches or changes the exposure setting value, the focus detection may not be successfully completed if the setting value is inappropriate. According to the configuration discussed in Japanese Patent Application Laid-Open No. 2010-271419, it is feasible to reduce the amount of noise included in the image signal to be used for the focus detection by performing the line addition processing based on the image signal. However, the adverse effect of the line addition that reduces the resolution of the photographic subject in the vertical direction is not taken into consideration.

SUMMARY OF THE INVENTION

The present invention is directed to a technique capable of controlling a line addition range of a focus detection area according to shooting conditions in a focus detection to be performed with an image sensor including a photoelectric conversion portion that has a pupil-dividing function. Accordingly, the present invention provides an imaging apparatus that can realize highly accurate focus detection processing while reducing the amount of noise included in an image signal and preventing the resolution in the vertical direction from deteriorating.

According to an aspect of the present invention, an imaging apparatus includes an image sensor, a focus detection unit configured to perform a focus detecting operation according to a phase difference detection method using a pair of light fluxes having passed through different exit pupils of a photographic optical system and detected by the image sensor, an addition unit configured to add outputs of a plurality of pixels positioned in a focus detection area selected in the image sensor, an addition range setting unit configured to set an addition range of the plurality of pixels positioned in the focus detection area, a defocus amount calculation unit configured to calculate a defocus amount based on an image shift amount obtained by the addition unit, and a focus adjustment unit configured to perform a focus adjusting operation using the defocus amount, wherein the addition range setting unit is configured to change the addition range based on an exposure setting value of the photographic optical system or the image sensor.

Further features of the present invention will become apparent from the following description of exemplary embodiments with reference to the attached drawings.

DESCRIPTION OF THE EMBODIMENTS

Figure 1:
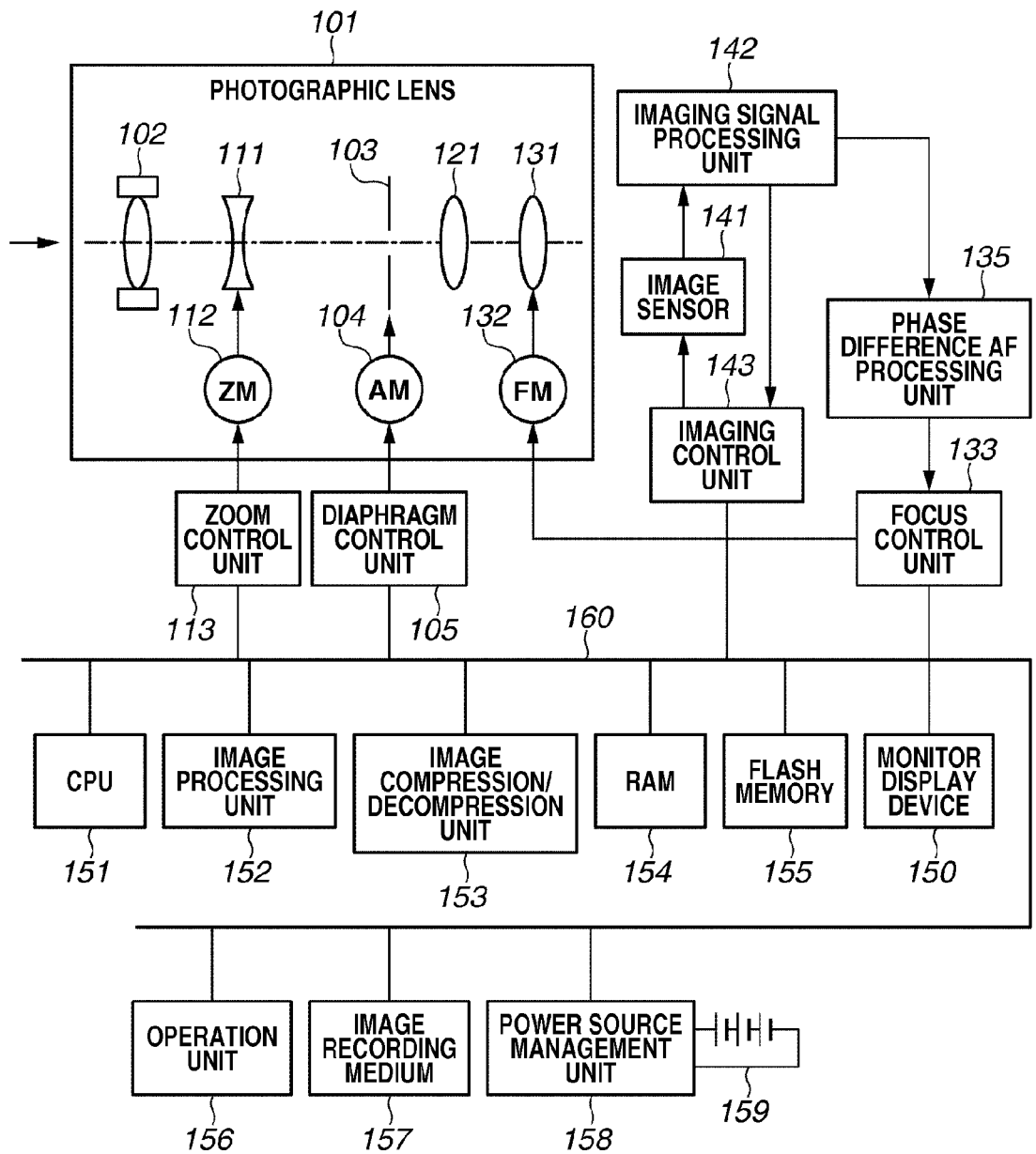
FIG. 1 is a block diagram illustrating a configuration example of an imaging apparatus according to a first exemplary embodiment.

Various exemplary embodiments, features, and aspects of the invention will be described in detail below with reference to the drawings. In the following drawings, members similar or identical to each other are denoted by the same reference numerals and redundant description thereof will be avoided.

<Configuration of Imaging Apparatus>

First, an example configuration of an imaging apparatus according to a first exemplary embodiment is described in detail below with reference to FIG. 1. FIG. 1 is a block diagram illustrating a configuration example of an imaging apparatus 100. The imaging apparatus 100 is a video camera or a digital still camera that is configured to capture an image of a photographic subject and store moving image data or still image data on an appropriate recording medium, such as a tape, a solid memory, an optical disk, or a magnetic disk, although the imaging apparatus 100 is not limited to the above-mentioned examples. The imaging apparatus 100 includes various units that are connected via a bus 160 and can be controlled by a main central processing unit (CPU) 151.

The imaging apparatus 100 includes a focus detection apparatus that is configured to perform a focus detecting operation according to a phase difference detection method using an image sensor including a plurality of photoelectric conversion elements (e.g., a first photoelectric conversion element and a second photoelectric conversion element) that shares the same microlens. The focus detection apparatus according to the present exemplary embodiment is applicable to an imaging system that includes an imaging apparatus (or an imaging apparatus body) configured to acquire an optical image via a photographic optical system (e.g., a photographic lens) and a photographic optical system detachable to the imaging apparatus body. However, the present exemplary embodiment is not limited to the above-mentioned example and can be applied to an imaging apparatus integrated with a photographic optical system.

A photographic lens 101 (i.e., a lens unit serving as the photographic optical system) includes a stationary first lens group 102, a zoom lens 111, a diaphragm 103, a stationary third lens group 121, and a focus lens 131, which are provided in the photographic optical system. A diaphragm control unit 105 is configured to drive the diaphragm 103 via a diaphragm motor 104 according to a command from the main CPU 151. More specifically, the diaphragm control unit 105 can change an aperture diameter of the diaphragm 103 in such a way as to adjust the quantity of light in a shooting operation.

A zoom control unit 113 is configured to drive the zoom lens 111 via a zoom motor 112 in such a way as to change the focal length. Further, a focus control unit 133 is configured to drive the focus lens 131 via a focus motor 132 in such a way as to control a focus adjustment state. The focus lens 131 is a focus adjusting lens, which is usually constituted by a plurality of lenses, although the focus lens 131 in FIG. 1 is simply illustrated as a single lens.

A photographic subject image formed on an image sensor 141 via the above-mentioned optical member (including the photographic lens 101) is converted into an electrical signal by the image sensor 141. The image sensor 141 is a photoelectric conversion element having the capability of photoelectrically converting a photographic subject image (i.e., an optical image) into an electrical signal. As described below, the image sensor 141 includes two photoelectric conversion elements (i.e., light-receiving areas), which are provided in each light-receiving element composed of m pixels disposed in the horizontal direction by n pixels disposed in the vertical direction. An imaging signal processing unit 142 is configured to generate an image signal (i.e., image data) based on the image formed on the image sensor 141 and photoelectrically converted as mentioned above.

A phase difference AF processing unit 135 is configured to detect (or calculate) an image shift amount in a division direction of the images obtained by dividing the light from the photographic subject, with reference to image signals (i.e., output signal values) individually (independently) output from a pair of photoelectric conversion elements (the first photoelectric conversion element and the second photoelectric conversion element). More specifically, the phase difference AF processing unit 135 functions as an image shift amount calculation unit configured to calculate an image shift amount by performing a correlation operation using signal values independently obtained from the first photoelectric conversion element and the second photoelectric conversion element.

Further, the phase difference AF processing unit 135 also functions as a defocus amount calculation unit configured to calculate a shift amount (i.e., a defocus amount) of the photographic lens 101 in the in-focus direction based on the detected image shift amount. The defocus amount can be calculated by multiplying a coefficient (i.e., a conversion factor) with the image shift amount. Each of operations to be performed by the image shift amount calculation unit and the defocus amount calculation unit can be performed based on a command from the main CPU 151. Further, the main CPU 151 or the focus control unit 133 can execute at least a part of these operations.

The main CPU 151 functions as an addition unit configured to add outputs from a plurality of pixels positioned in a focus detection area selected in the image sensor.

The phase difference AF processing unit 135 outputs the calculated image shift amount (i.e., the defocus amount) to the focus control unit 133. The focus control unit 133 determines a driving amount to drive the focus motor 132 based on a deviation of the photographic lens 101 in an in-focus direction. The focus control unit 133 and the focus motor 132 cooperatively control the movement of the focus lens 131 to realize AF control according to the phase difference detection method.

The image data output from the imaging signal processing unit 142 is transmitted to an imaging control unit 143 and temporarily stored in a random access memory (RAM) 154. The image data stored in the RAM 154 is compressed by an image compression/decompression unit 153 and subsequently recorded on an image recording medium 157. Meanwhile, the image data stored in the RAM 154 is transmitted to an image processing unit 152. The image processing unit 152 is configured to process an image signal obtained using an addition signal obtained by adding outputs of the first photoelectric conversion element and the second photoelectric conversion element.

The image processing unit 152 performs reduction/enlargement processing on the image data, for example, to have an optimum size. The image data having been processed to have the optimum size is transmitted to a monitor display device 150, which displays an image based on the processed image data. Therefore, the operator can observe the captured image in real time. The monitor display device 150 displays the captured image for a predetermined time immediately after completing an image capturing operation so that the operator can confirm the captured image.

An operation unit 156 (i.e., an operation switch) enables the operator to input an instruction to the imaging apparatus 100. An operation instruction signal input via the operation unit 156 is transmitted to the main CPU 151 via the bus 160.

The imaging control unit 143 is configured to control the image sensor 141 based on a command from the main CPU 151. In advance, the main CPU 151 determines the following setting values according to an operator's instruction input via the operation unit 156 or based on the magnitude of a pixel signal (i.e., the image data) temporarily stored in the RAM 154.

More specifically, the main CPU 151 determines various setting values, including a storage time of the image sensor 141, a gain setting value to be used when the image sensor 141 outputs a signal to the imaging signal processing unit 142, a diaphragm value of the lens unit, and a pixel signal reading mode. The imaging control unit 143 receives an instruction including the determined setting values (i.e., storage time, gain setting value, and pixel signal reading mode) from the main CPU 151 and controls the image sensor 141 based on the received information.

A power source management unit 158 is configured to appropriately manage a battery 159. The battery 159 can stably supply electric power to various components constituting the imaging apparatus 100. A flash memory 155 stores a control program that is required for the imaging apparatus 100 to perform various operations. If the imaging apparatus 100 is activated in response to an operator's operation (more specifically, in response to shifting from power OFF state to power ON state), the control program is read (loaded) from the flash memory 155 into a part of the RAM 154. The main CPU 151 controls the operations to be performed by the imaging apparatus 100 according to the control program loaded into the RAM 154.

<Focus Control Operation>

Figure 2:
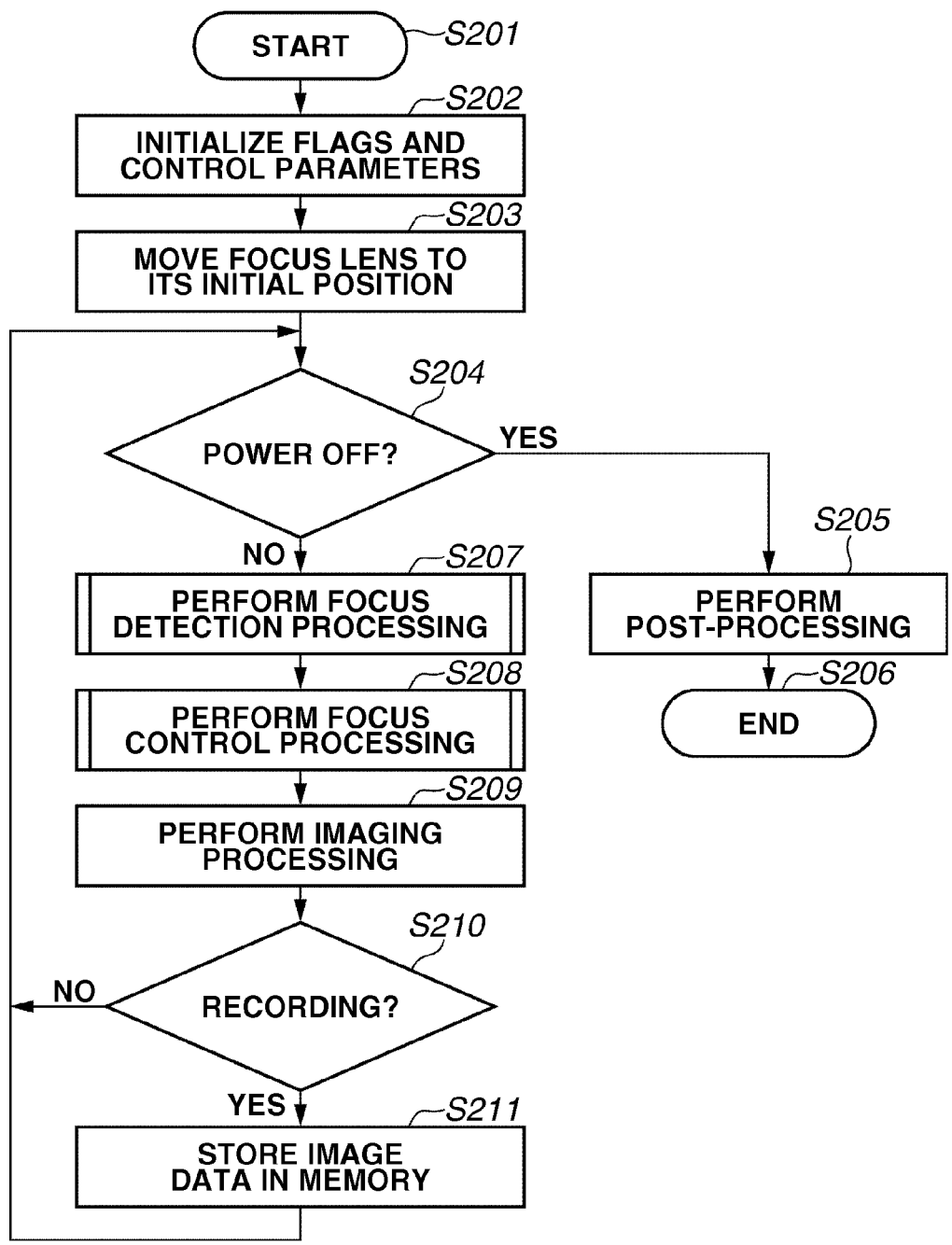
FIG. 2 is a flowchart illustrating an operation that can be performed by the imaging apparatus according to the first exemplary embodiment.

Next, an operation including focus control (i.e., focus adjustment) that can be performed by the imaging apparatus 100 is described in detail below with reference to FIG. 2. FIG. 2 is a flowchart illustrating an operation that can be performed by the imaging apparatus 100. Processing in each step illustrated in FIG. 2 can be performed based on a command from the main CPU 151.

First, in step S201, the main CPU 151 starts arithmetic (i.e., control) processing in response to a power ON operation of the imaging apparatus 100. Subsequently, in step S202, the main CPU 151 initializes flags and control parameters of the imaging apparatus 100. Then, in step S203, the main CPU 151 moves the optical member (e.g., the focus lens 131) to its initial position.

Next, in step S204, the main CPU 151 detects whether the operator has performed a power OFF operation. More specifically, the main CPU 151 checks the presence of the power OFF operation. If it is determined that the power OFF operation has been detected (YES in step S204), the operation proceeds to step S205. In step S205, the main CPU 151 performs post-processing, which includes moving the optical member to its initial position and clearing various flags and control parameters to turn off the power source of the imaging apparatus 100. Then, in step S206, the main CPU 151 terminates the processing (i.e., the control) of the imaging apparatus 100.

On the other hand, if the power OFF operation has not been detected (NO in step S204), the operation proceeds to step S207. In step S207, the main CPU 151 performs focus detection processing. Subsequently, in step S208, the focus control unit 133 drives the focus lens 131 with reference to the information (driving direction, driving speed, and position) determined in step S207 and moves the focus lens 131 to a desired position.

Subsequently, in step S209, the image sensor 141 performs imaging processing to photoelectrically convert a photographic subject image. Further, the imaging signal processing unit 142 outputs an image signal by performing predetermined processing (e.g., image processing) on the photoelectrically-converted photographic subject image. Then, in step S210, the main CPU 151 detects whether the operator has pressed a recording button (included in the operation unit 156) to confirm whether the recording is currently in progress. If it is determined that the recording is not currently in progress (NO in step S210), the operation returns to step S204.

On the other hand, if it is determined that the recording is currently in progress (YES in step S210), the operation proceeds to step S211. In step S211, the image compression/decompression unit 153 compresses the image signal (i.e., the image data) output from the imaging signal processing unit 142 and records the compressed signal (i.e., the compressed data) on the image recording medium 157. Then, the operation returns to step S204 to repeat the processing in each of the above-mentioned steps.

<Phase Difference Detection Method>

Figure 3A:
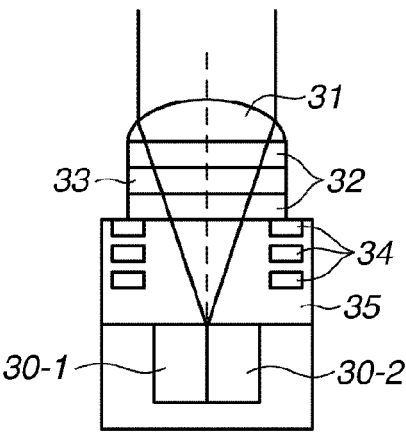
FIGS. 3A, 3B, and 3C illustrate an image sensor according to the first exemplary embodiment.

Next, a phase difference detection method (i.e., an imaging plane phase difference AF method) according to the present exemplary embodiment is described in detail below. First, an example configuration of the image sensor 141 is described in detail below with reference to FIGS. 3A, 3B, and 3C. FIG. 3A is a cross-sectional view illustrating a pixel configuration of the image sensor 141 having a pupil-dividing function. A photoelectric conversion element 30 includes two photoelectric conversion elements that are provided to realize the pupil-dividing function for each pixel. More specifically, the photoelectric conversion element 30 includes a photoelectric conversion element 30-1 (i.e., the first photoelectric conversion element) and a photoelectric conversion element 30-2 (i.e., the second photoelectric conversion element). A microlens 31 (i.e., an on-chip microlens) has the capability of efficiently condensing the light onto the photoelectric conversion element 30. Two photoelectric conversion elements 30-1 and 30-2 are disposed in such a manner that the boundary between these elements agrees with an optical axis. Further, each pixel includes flattening films 32, a color filter 33, wirings 34, and an interlayer insulator 35 that are provided inside thereof.

Figure 3B:
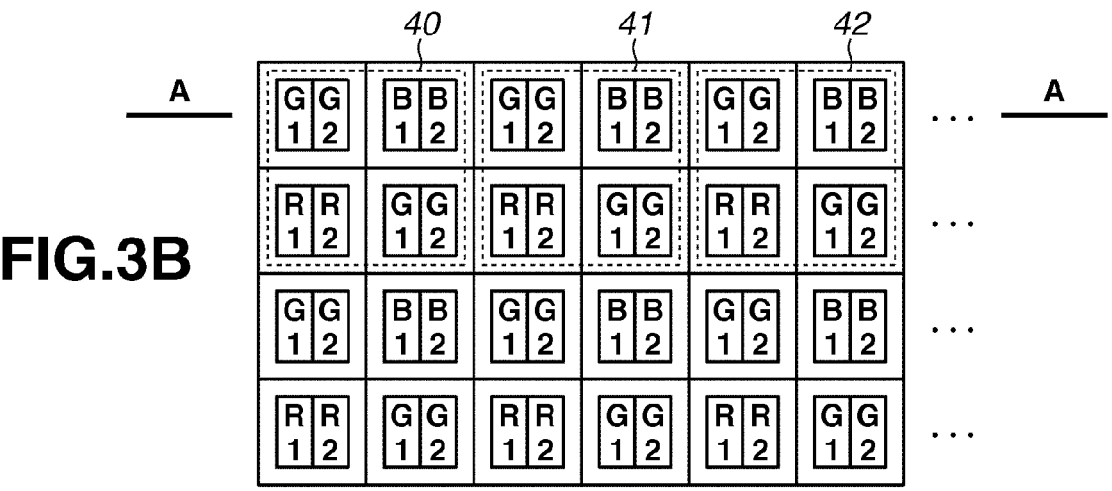

FIG. 3B is a plan view illustrating a configuration of a part of the image sensor 141. The image sensor 141 includes a plurality of pixels, each having the configuration illustrated in FIG. 3A. As illustrated in FIG. 3B, red (R), green (G), and blue (B) color filters 33 are alternately disposed on respective pixel blocks 40, 41, and 42, each being constituted by a set of four pixels, in such a way as to constitute the Bayer array, to perform an image capturing operation. In FIG. 3B, numerical values "1" and "2" beneath R, G, and B indicate the photoelectric conversion elements 30-1 and 30-2, respectively.

Figure 3C:
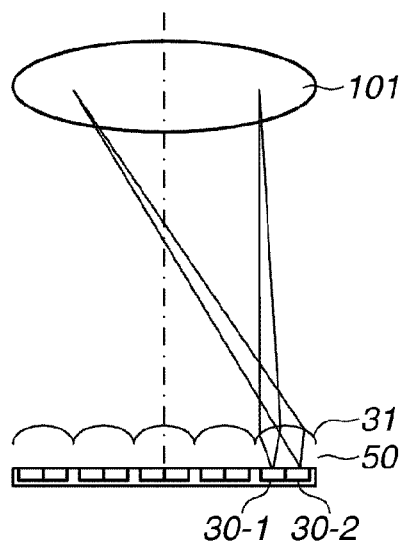

FIG. 3C is a partial cross-sectional view taken along line A-A illustrated in FIG. 3B, which illustrates the principle of optics of the image sensor 141. The image sensor 141 is disposed on a planned image plane of the photographic lens 101. With the function of the microlens 31, the photoelectric conversion elements 30-1 and 30-2 are configured to receive a pair of light fluxes having passed through different portions (i.e., areas) of a pupil (i.e., an exit pupil) of the photographic lens 101. More specifically, the photoelectric conversion element 30-1 mainly receives a light flux passing through the right half of the pupil of the photographic lens 101 illustrated FIG. 3C. On the other hand, the photoelectric conversion element 30-2 mainly receives a light flux passing through the left half of the pupil of the photographic lens 101 illustrated in FIG. 3C.

<Pupil of Image Sensor>

Figure 4:
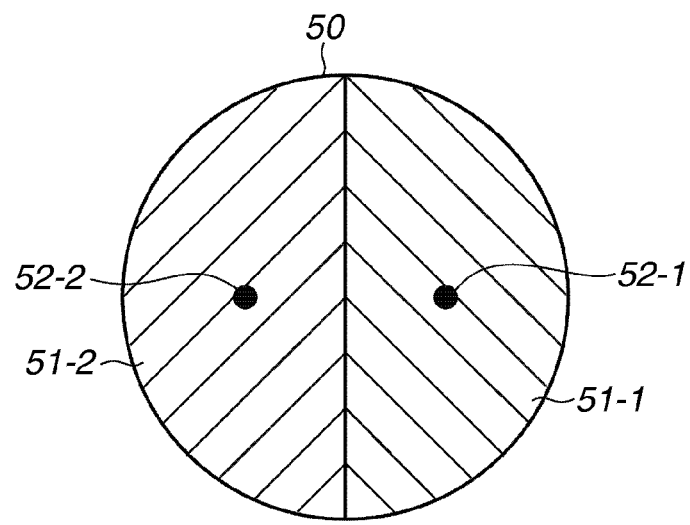
FIG. 4 illustrates a pupil of a photographic lens according to the first exemplary embodiment.

The pupil of the image sensor 141 is described in detail below with reference to FIG. 4. FIG. 4 illustrates a pupil 50 of the photographic lens 101 (serving as a component of the photographic optical system), as viewed from the image sensor 141. The pupil 50 includes a sensitive region 51-1 (hereinafter, referred to as an image "A" pupil) of the photoelectric conversion element 30-1 and a sensitive region 51-2 (hereinafter, referred to as an image "B" pupil) of the photoelectric conversion element 30-2. The image "A" pupil and the image "B" pupil have the center of mass at positions 52-1 and 52-2, respectively.

In image capturing processing according to the present exemplary embodiment, it is feasible to generate an image signal by adding outputs of two photoelectric conversion elements that are similar in color of the color filter disposed at the same pixel. On the other hand, when the focus detection processing is performed according to the present exemplary embodiment, a focus detection signal of one pixel can be acquired by integrating outputs of photoelectric conversion elements corresponding to the photoelectric conversion element 30-1 in one pixel block.

Further, it is feasible to generate the image "A" signal by continuously acquiring the above-mentioned signal in the horizontal direction (e.g., in order of the pixel blocks 40, 41, and 42). Similarly, a focus detection signal of one pixel can be acquired by integrating outputs of photoelectric conversion elements corresponding to the photoelectric conversion element 30-2 in one pixel block. Further, it is feasible to generate the image "B" signal by continuously acquiring the above-mentioned signal in the horizontal direction. The image "A" signal and the image "B" signal can be used to generate a pair of phase difference detection signals.

<Focus Detection Area>

Figure 5:
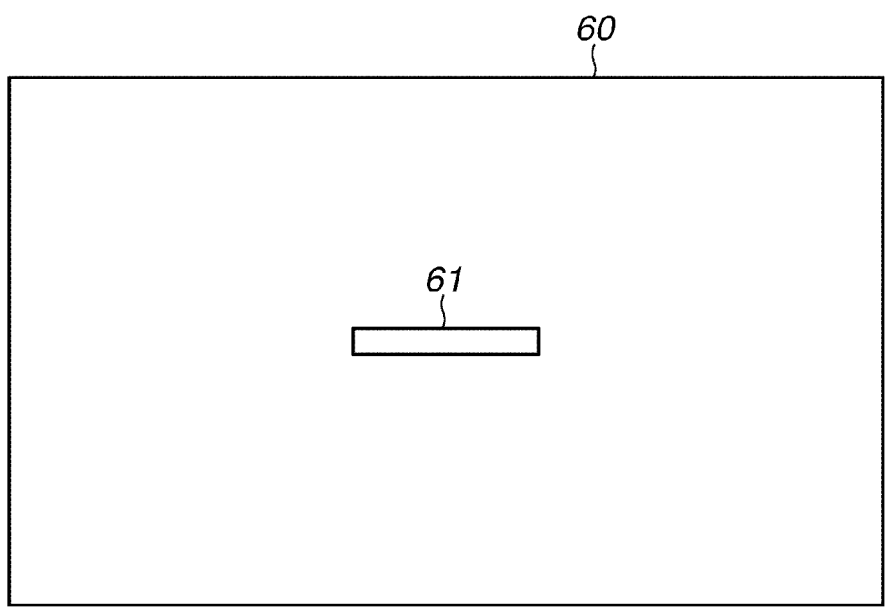
FIG. 5 illustrates a focus detection area according to the first exemplary embodiment.

Subsequently, a focus detection area to be used in a focus detection method according to the present exemplary embodiment is described in detail below with reference to FIG. 5. FIG. 5 illustrates the focus detection area. As illustrated in FIG. 5, a focus detection area 61 is provided appropriately within an imaging angle of view 60. The phase difference AF processing unit 135 generates the above-mentioned pair of phase difference detection signals using the focus detection area 61 and performs focus detection processing. Although not illustrated, it is feasible to set a plurality of focus detection areas that are provided within the imaging angle of view 60. In the present exemplary embodiment, two photoelectric conversion elements are provided in each of all pixels that constitute the image sensor 141, and the focus detection method includes generating a pair of phase difference detection signals from the focus detection area. However, the present invention is not limited to the above-mentioned example. For example, the image sensor 141 can be configured to have the structure (i.e., divided pixel structure) illustrated in FIG. 3A only in the focus detection area.

<Exposure Setting Value>

The image sensor according to the present exemplary embodiment outputs signals to be used by a focus detection unit and an imaging unit. Therefore, when the imaging apparatus performs automatic exposure correction, the image sensor is controlled based on an exposure setting value appropriately set for a shooting operation. In such a case, the exposure setting value may not be appropriate for the focus detection. In particular, when an output gain value of the image sensor is set to be higher, or when a target exposure value corresponding to a pixel dynamic range becomes smaller due to gamma correction settings, an image signal to be used for the focus detection becomes smaller and the amount of noise may increase.

Figure 6:
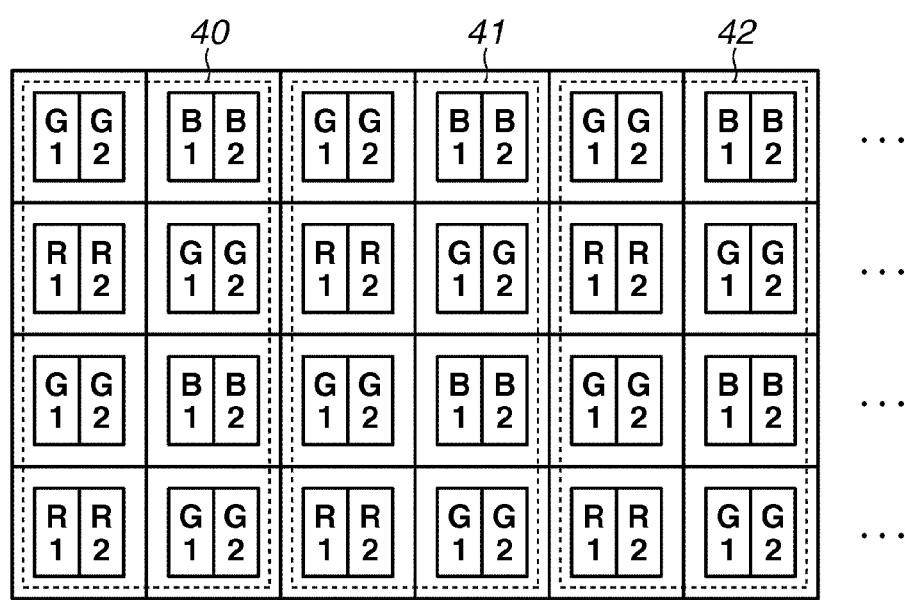
FIG. 6 illustrates addition of lines in the focus detection area according to the first exemplary embodiment.

As a result, the dispersion of focus detection result becomes greater. Further, even in a case where the operator manually sets an exposure value, changing the storage time of the image sensor or the diaphragm size of the lens gives a significant influence on the image signal to be used for the focus detection. Therefore, the focus detection may become difficult if the setting value is inappropriate. Therefore, an example addition of lines illustrated in FIG. 6 is usable to generate one pixel in the focus detection area. The example illustrated in FIG. 6 includes an appropriate range added in the vertical direction that corresponds to two pixels constituting the Bayer array (hereinafter, referred to as "two lines addition"). More specifically, the image signal to be used for the focus detection can be generated by averaging an increased number of pixels. The number of lines (hereinafter, referred to as "line addition number") is a value that can be arbitrarily set. If the line addition number is large, the focus detection area 61 becomes greater in the vertical direction in the imaging angle of view 60.

Increasing the number of lines to be added is effective in reducing the amount of noise included in the image signal to be used for the focus detection. However, in a case where a photographic subject is obliquely positioned in the focus detection area, increasing the line addition number may deteriorate the resolution.

The imaging apparatus according to the present exemplary embodiment performs line addition range control for the focus detection area according to shooting conditions, as described in detail below. The imaging apparatus according to the present exemplary embodiment can reduce the amount of noise by increasing the line addition number according to the target exposure value corresponding to the pixel dynamic range, which is variable depending on gamma correction settings and image sensor output gain settings. Further, the imaging apparatus according to the present exemplary embodiment can sufficiently secure the resolution in the vertical direction while taking the depth of field into consideration by changing the line addition number according to the diaphragm size of the lens.

<Line Addition Number Setting Method>

Figure 7:
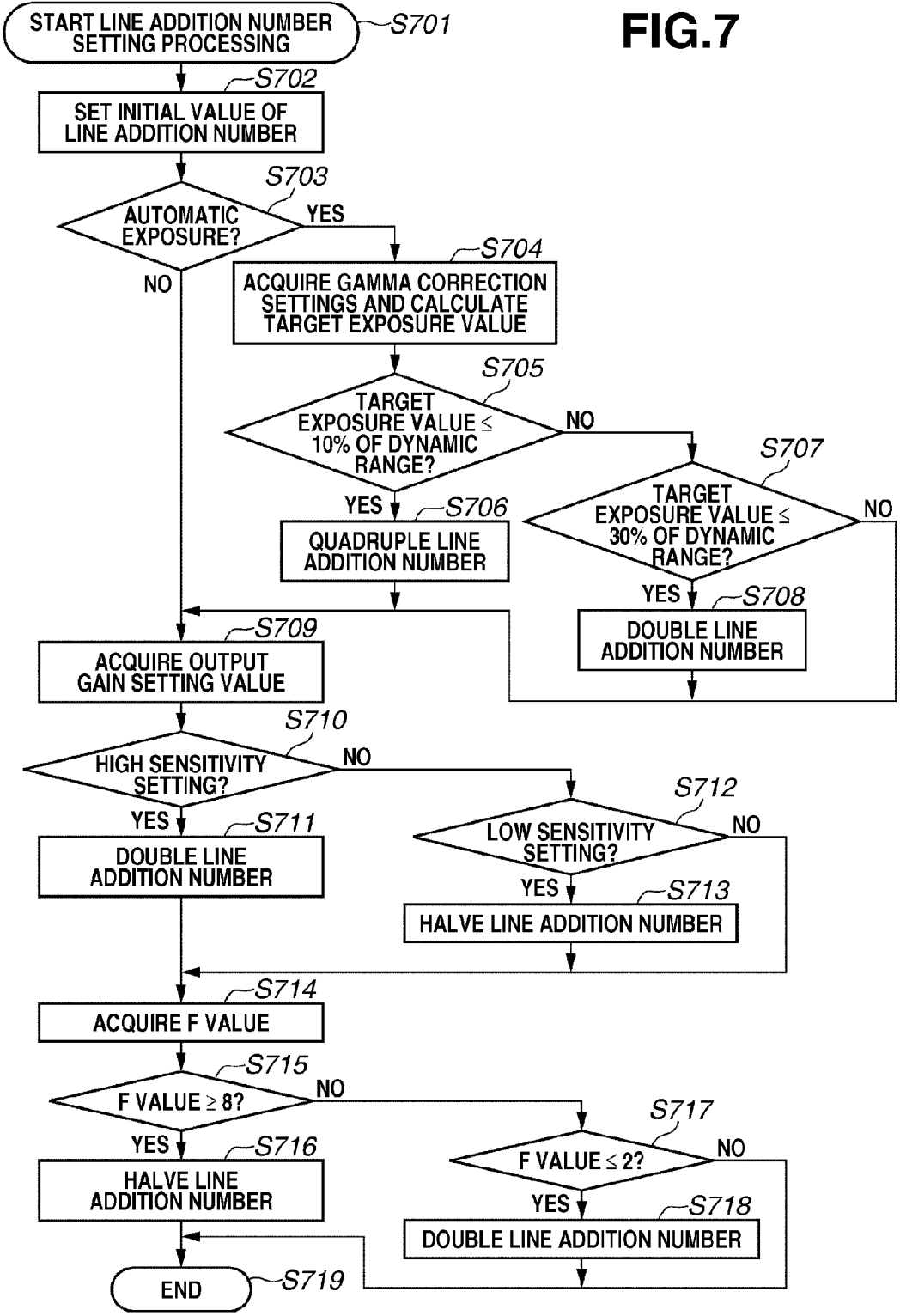
FIG. 7 is a flowchart illustrating a line addition number setting method according to the first exemplary embodiment.

FIG. 7 is a flowchart illustrating a line addition number setting method applicable to a focus detection area according to the present exemplary embodiment. Processing in each step illustrated in FIG. 7 can be performed by the main CPU 151. First, in step S701, the main CPU 151 starts line addition number setting processing for the focus detection area 61. In step S702, the main CPU 151 sets an initial value of the line addition number. In the present exemplary embodiment, the initial setting value of the line addition number is eight lines. Subsequently, in step S703, the main CPU 151 determines whether an automatic exposure mode is set.

If it is determined that the automatic exposure mode is not set (NO in step S703), the operation proceeds to step S709. If it is determined that the automatic exposure mode is set (YES in step S703), then in step S704, the main CPU 151 acquires the gamma correction settings and calculates a target exposure value. In step S705, the main CPU 151 determines whether the target exposure value is equal to or less than 10% of the dynamic range of one pixel with reference to the gamma correction settings. If it is determined that the target exposure value is equal to or less than 10% (YES in step S705), then in step S706, the main CPU 151 quadruples the line addition number. Otherwise (NO in step S705), the operation proceeds to step S707, in which the main CPU 151 determines whether the target exposure value is equal to or less than 30% of the dynamic range of one pixel with reference to the gamma correction settings. If it is determined that the target exposure value is equal to or less than 30% (YES in step S707), then in step S708, the main CPU 151 sets a doubled line addition number.

In step S709, the main CPU 151 acquires an output gain setting value of the image sensor 141. In step S710, the main CPU 151 determines whether the gain setting value is equal to or greater than a predetermined value. If it is determined that the gain setting value is directed to high sensitivity setting (YES in step S710), then in step S711, the main CPU 151 sets a doubled line addition number. If it is determined that the gain setting value is not directed to high sensitivity setting, then in step S712, the main CPU 151 determines whether the gain setting is smaller than another predetermined value. If it is determined that the gain setting value is directed to low sensitivity setting (YES in step S711), then in step S713, the main CPU 151 halves the line addition number.

In step S714, the main CPU 151 acquires an F value (i.e., an F number). Then, in step S715, the main CPU 151 determines whether the acquired F value is equal to greater than 8. If it is determined that the acquired F value is equal to greater than 8 (YES in step S715), then in step S716, the main CPU 151 halves the line addition number. If it is determined that the acquired F value is less than 8 (NO in step S715), then in step S717, the main CPU 151 determines whether the acquired F value is equal to or less than 2. If it is determined that the acquired F value is equal to less than 2 (YES in step S717), then in step S718, the main CPU 151 doubles the line addition number.

Then, in step S719, the main CPU 151 terminates the processing of the flowchart illustrated in FIG. 7. In a case where the F value is small, the main CPU 151 increases the line addition number to perform focus detection processing with increased accuracy because the depth of field is small. Further, in a case where the focal point is far from the in-focus position, an image captured by the image sensor 141 tends to have a low contrast value. On the other hand, in a case where the F value is large, the main CPU 151 reduces the line addition number to secure the resolution in the vertical direction because the depth of field is large.

Numerical values used in the present exemplary embodiment are mere examples. The line addition numbers in the increase/decrease settings are not limited to 2 and ½. For example, it is useful to set five lines as the line addition numbers in the increase/decrease settings. Further, the initial value of the line addition number can be set arbitrarily depending on the image sensor structure or the camera model. Further, although the main CPU 151 has selected one of three stages (e.g., doubled, unmagnified, and halved) in changing the line addition number for each of gamma setting based target exposure value, gain setting value, and F value, it is also useful to set the line addition number more finely. Further, instead of performing the processing in steps S715 to S718, the main CPU 151 can change the line addition number with reference to a combination of F value and storage time as illustrated in Table 1.

The storage time indicates the time required for the image sensor 141 to store electric charges when the image sensor 141 receives a pair of light fluxes having passed through different exit pupils of a photographic optical system.

The imaging apparatus according to the present exemplary embodiment increases the line addition number when the storage time is less than $1/300$ sec because the amount of noise included in the image signal to be used for the focus detection increases remarkably. On the other hand, the imaging apparatus according to the present exemplary embodiment reduces the line addition number to secure the resolution in the vertical direction when the storage time is equal to or greater than $1/300$ sec because the amount of noise included in the image signal to be used for the focus detection is negligible.

TABLE 1

|  | STORAGE TIME < $1/300$ SEC | STORAGE TIME ≥ $1/300$ SEC |
|---|---|---|
| F VALUE < 2 | DOUBLE LINE ADDITION NUMBER | HOLD SAME LINE ADDITION NUMBER |
| F VALUE ≥ 2 | HOLD SAME LINE ADDITION NUMBER | HALVE LINE ADDITION NUMBER |

<Image Signal>

Figure 8:
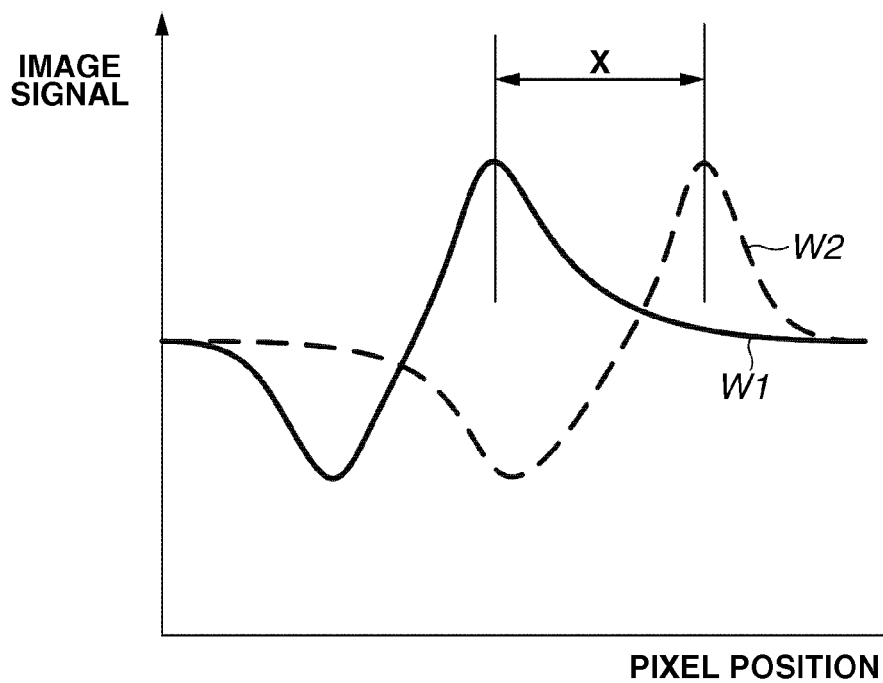
FIG. 8 is a graph illustrating image signals according to the first exemplary embodiment.

Next, the image "A" signal and the image "B" signal (hereinafter, collectively referred to as "image signal") are described in detail below with reference to FIG. 8. FIG. 8 a graph illustrating the image signals "A" and "B", in which the vertical axis represents the level of the image signal and the horizontal axis represents the pixel position. Further, in the graph of FIG. 8, a curve W1 indicates the image "A" signal and a graph curve W2 indicates the image "B" signal. An image shift amount X between a pair of generated phase difference detection signals is variable depending on an image forming state (e.g., in-focus state, near-focus state, or far-focus state) of the photographic lens 101. When the photographic lens 101 is brought into the in-focus state, the image shift amount X between two image signals becomes zero. On the other hand, when the photographic lens 101 is in the near-focus state or in the far-focus state, an image shift appears in a positive or negative direction. Further, the image shift amount has a predetermined relationship with the distance between a position where a photographic subject image is formed by the photographic lens 101 and an upper surface of the microlens (i.e., the defocus amount).

<Conversion into Defocus Amount>

Figure 9A:
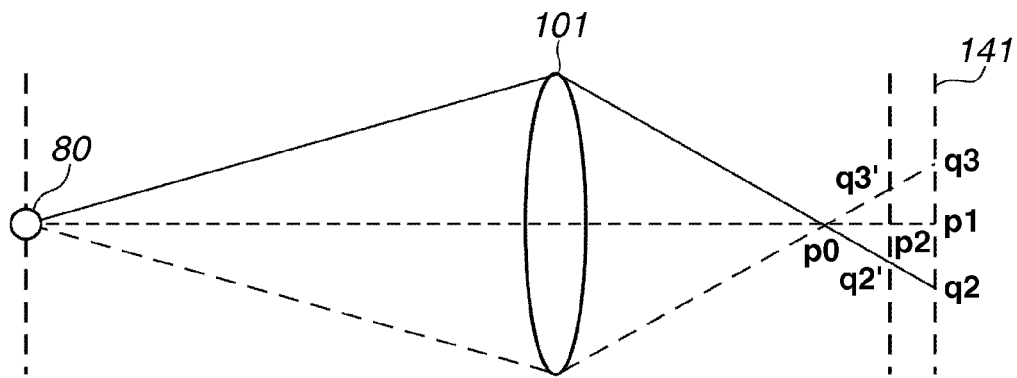
FIGS. 9A and 9B illustrate an optical system and image signals according to the first exemplary embodiment.
Figure 9B:
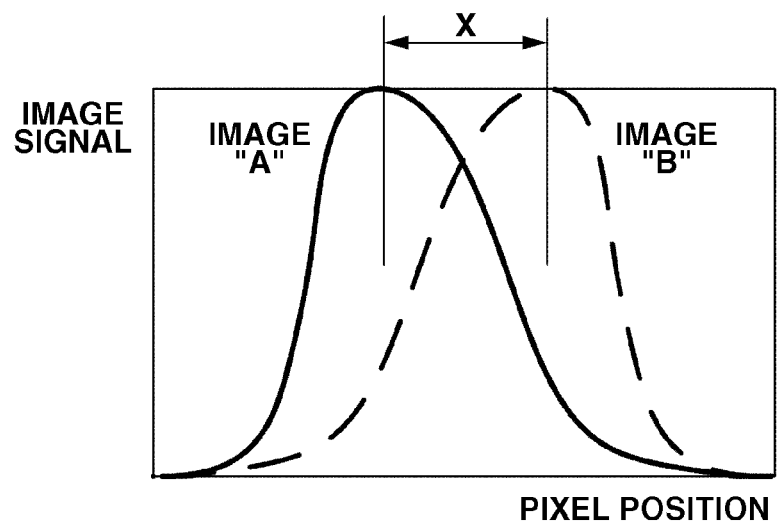

Next, a conversion from an image shift amount calculated by performing the correlation operation into a defocus amount is described in detail below with reference to FIGS. 9A and 9B. FIG. 9A illustrates an optical system including the photographic lens 101 and the image sensor 141. A planned image plane corresponding to a photographic subject 80 is positioned at a point p0 and a focus detection surface is positioned at a point p1 on an optical axis OA. FIG. 9B illustrates image signals formed at the position p1 of the focus detection surface. The relationship between the image shift amount and the defocus amount is determined according to the optical system. The defocus amount can be calculated by multiplying a predetermined coefficient K (i.e., a conversion factor) with the image shift amount X. The coefficient K can be calculated based on the center-of-mass positions of the image "A" pupil and the image "B" pupil. When the focus detection surface moves from the position p1 to a position p2, the image shift amount X changes according to a similar figure relationship between a triangle defined by three points p0, q2, and q3 and a triangle defined by three points p0, q2', and q3'. Therefore, it is feasible to calculate a defocus amount at the position p2 on the focus detection surface. The main CPU 151 calculates the position of the focus lens 131 to obtain the in-focus state of the photographic subject based on the defocus amount.

<Focus Detection Method>

Figure 10:
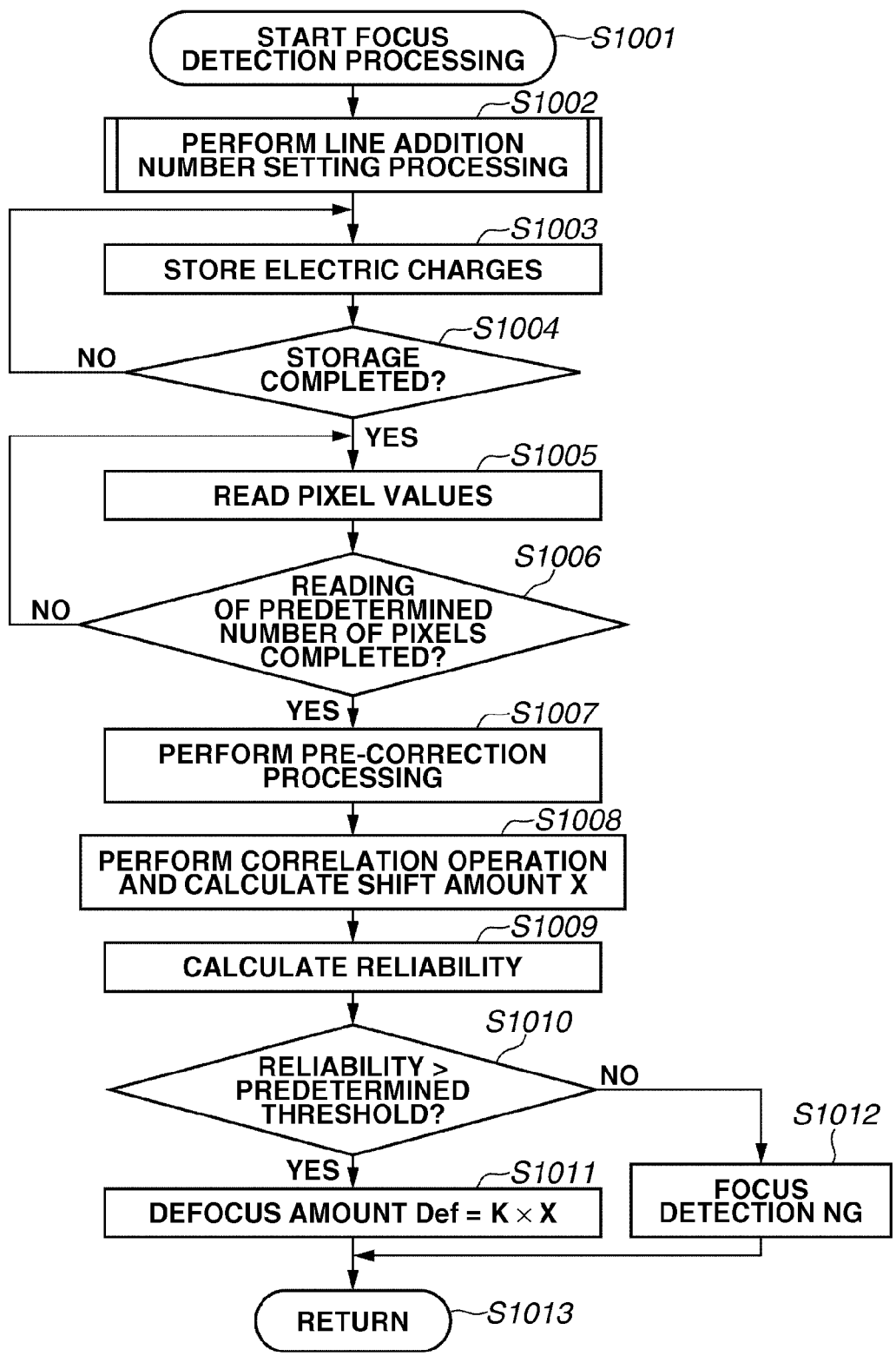
FIG. 10 is a flowchart illustrating a focus detection method according to the first exemplary embodiment.

Subsequently, the focus detection method according to the present exemplary embodiment is described in detail below with reference to FIG. 10. FIG. 10 is a flowchart illustrating the focus detection method. The main CPU 151, the phase difference AF processing unit 135, and the focus control unit 133 cooperatively execute processing of respective steps illustrated in FIG. 10, which corresponds to step S207 illustrated in FIG. 2.

First, in step S1001, the main CPU 151 starts focus detection processing. In step S1002, the main CPU 151 performs the line addition number setting processing described with reference to the flowchart illustrated in FIG. 7. Subsequently, in step S1003, the image sensor 141 stores electric charges. Then, in step S1004, the main CPU 151 determines whether the storage of electric charges has been completed. If it is determined that the electric charge storage operation of the image sensor 141 is not yet completed (NO in step S1004), the operation returns to step S1003. Then, the image sensor 141 continues storing electric charges. On the other hand, if it is determined that the storage of electric charges has been completed (YES in step S1004), then in step S1005, the main CPU 151 reads pixel values of image signals existing in the focus detection area.

In step S1006, the main CPU 151 determines whether the reading operation for a predetermined number of pixels existing in the focus detection area has been completed. If it is determined that the reading operation for the predetermined number of pixels is not yet completed (NO in step S1006), the operation returns to step S1005. Then, the main CPU 151 repeats the above-mentioned processing in steps S1005 to S1006 until the completion of the reading operation for the predetermined number of pixels. The above-mentioned reading operation for the predetermined number of pixels is performed in a state where pixels of a designated number of lines are added.

Subsequently, in step S1007, the focus control unit 133 performs pre-correction processing on the acquired image signals. The pre-correction processing includes correction processing to be applied to the image signals having been read and filter processing (e.g., averaging filter or edge enhancement filter) to be applied to the image signals. Then, in step S1008, the main CPU 151 (i.e., the focus control unit 133 or the phase difference AF processing unit 135) performs a correlation operation to acquire a shift amount at which the correlation becomes highest. In the correlation operation, the main CPU 151 calculates correlation values while shifting the pixels of the image "A" signal and the image "B" signal in the focus detection area and obtains the difference between two positions where the correlation value can be maximized, as an image shift amount.

In calculating the correlation values, the main CPU 151 compares corresponding signal components of two image signals overlapped with each other and acquires an accumulation of smaller values (or larger values) or acquires a difference between these accumulated values. The accumulated value is usable as an index indicating the correlation. In a case where the acquired value is the accumulation of smaller values, the correlation becomes maximum when the acquired value is largest. In a case where acquired value is the accumulation of larger values (or the above-mentioned difference), the correlation becomes maximum when the acquired value is smallest.

After completing the calculation of the shift amount at which the correlation becomes highest, the main CPU 151 performs an interpolating operation using correlation values of the acquired shift amount and two neighboring (i.e., preceding and subsequent) shift amounts and calculates an interpolation value equivalent to or less than one shift. A sum of the shift amount and the interpolation value is equal to the image shift amount X. As described above, the main CPU 151 serving as the image shift amount calculation unit, the focus control unit 133 or the phase difference AF processing unit 135 calculate the image shift amount by performing the correlation operation using signal values independently obtained from the first photoelectric conversion element and the second photoelectric conversion element.

Subsequently, in step S1009, the main CPU 151 (i.e., the focus control unit 133 or the phase difference AF processing unit 135) evaluates the reliability of the calculated image shift amount X. The reliability can be calculated based on the contrast of each image signal or the degree of coincidence between two image signals.

Subsequently, in step S1010, the main CPU 151 (i.e., the focus control unit 133 or the phase difference AF processing unit 135) determines whether the calculated reliability is greater than a predetermined threshold value (whether a reliable image shift amount X has been obtained).

If it is determined that the calculated reliability is greater than the predetermined threshold value (YES in step S1010), then in step S1011, the main CPU 151 calculates a defocus amount Def by multiplying the corrected coefficient K with the calculated image shift amount X (namely, Def=K×X).

The main CPU 151 functions as an addition range setting unit configured to set an addition range of a plurality of pixels existing in the focus detection area.

Then, in step S1013, the main CPU 151 terminates the focus detection processing of the flowchart illustrated in FIG. 10. On the other hand, if it is determined that the calculated reliability is equal to or less than the predetermined threshold value (namely, if a reliable image shift amount has not been detected) (NO in step S1010), then in step S1012, the main CPU 151 does not perform the focus detection processing (i.e., focus detection NG). Then, in step S1013, the main CPU 151 terminates the processing of the flowchart illustrated in FIG. 10.

<Focus Control Method>

Figure 11:
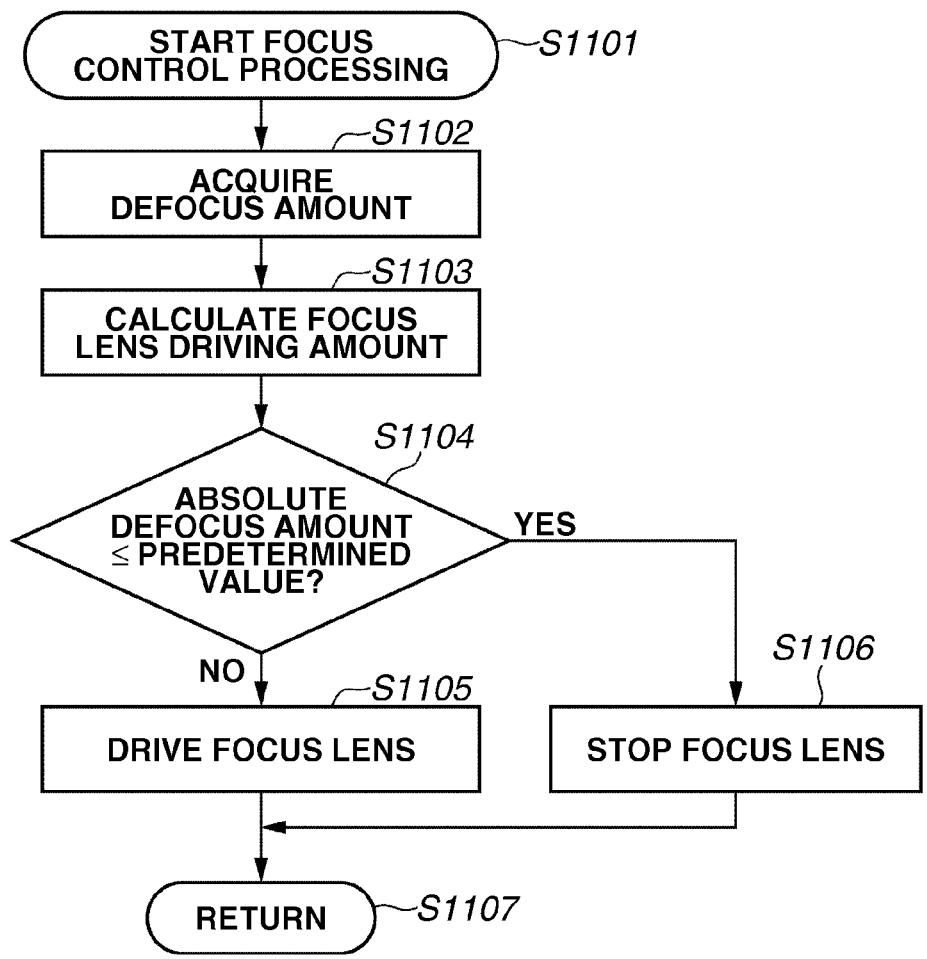
FIG. 11 is a flowchart illustrating a focus control method according to the first exemplary embodiment.

Next, a focus control method (i.e., a focus adjustment method) according to the present exemplary embodiment is described in detail below with reference to FIG. 11. FIG. 11 is a flowchart illustrating the focus control method according to the present exemplary embodiment. If the focus control method according to the present exemplary embodiment is started, the main CPU 151 performs predetermined arithmetic processing. Then, the focus control unit 133 controls the focus motor 132 based on a command from the main CPU 151. The main CPU 151 and the focus control unit 133 execute processing in respective steps illustrated in FIG. 11, which correspond to step S208 illustrated in FIG. 2.

First, if the focus control processing is started in step S1101, then in step S1102, the focus control unit 133 acquires the defocus amount calculated according to the focus detection method illustrated in FIG. 10. Then, in step S1103, the focus control unit 133 calculates a driving amount of the focus lens 131 (i.e., a lens driving amount) based on the defocus amount. Further, the calculation of the lens driving amount includes calculation of lens driving direction and speed. Subsequently, in step S1104, the main CPU 151 (i.e., the focus control unit 133) determines whether the absolute value of the defocus amount is equal to or less than a predetermined value.

If it is determined that the absolute value of the defocus amount is greater than the predetermined value (NO in step S1104), the operation proceeds to step S1105. In step S1105, the focus control unit 133 drives the focus lens 131 according to the lens driving amount calculated in step S1103 because the focus lens 131 is regarded as being not brought into the in-focus position (i.e., an in-focus point). Then, the operation proceeds to step S1107. After that, the main CPU 151 repeats the focus detection processing and the focus lens driving operation according to the flowchart illustrated in FIG. 2.

On the other hand, if it is determined that the absolute value of the defocus amount is equal to or less than the predetermined value (YES in step S1104), the operation proceeds to step S1106. In step S1106, the focus control unit 133 stops driving the focus lens because the focus lens 131 is regarded as being positioned on the in-focus point. Then, the operation proceeds to step S1107. After that, the main CPU 151 performs the focus detection processing according to the flowchart illustrated in FIG. 2. If the defocus amount exceeds the predetermined value again, the focus control unit 133 drives the focus lens 131.

As described above, the focus detection apparatus increases the line addition number according to the target exposure value corresponding to the pixel dynamic range that is variable depending on a gamma correction setting value or an image sensor output gain setting value. Thus, the focus detection apparatus can reduce the amount of noise and can suppress the dispersion of focus detection result. Further, the focus detection apparatus changes the line addition number according to the diaphragm size of the lens. Thus, it is feasible to secure the resolution in the vertical direction. In particular, in a case where a photographic subject is obliquely positioned in the focus detection area, it is feasible to prevent the detection accuracy from deteriorating.

Next, a line addition number setting method according to a second exemplary embodiment of the present invention is described in detail below. The method according to the above-mentioned first exemplary embodiment is characterized in that the line addition number of the focus detection area is set based on an exposure setting value. On the other hand, the method according to the present exemplary embodiment is characterized in that the line addition number of the focus detection area is set based on the defocus amount, as described in detail below. In the present exemplary embodiment, contents similar or identical to those described in the first exemplary embodiment are denoted by the same reference numerals and redundant description thereof will be avoided.

The main CPU 151 functions as an in-focus state determination unit configured to identify a focusing state of a focus detection result obtained based on the defocus amount.

The addition range setting unit sets an addition range to be set when the focusing state is close to the in-focus state to be smaller than an addition range to be set when the focusing state is far from the in-focus state.

Figure 12:
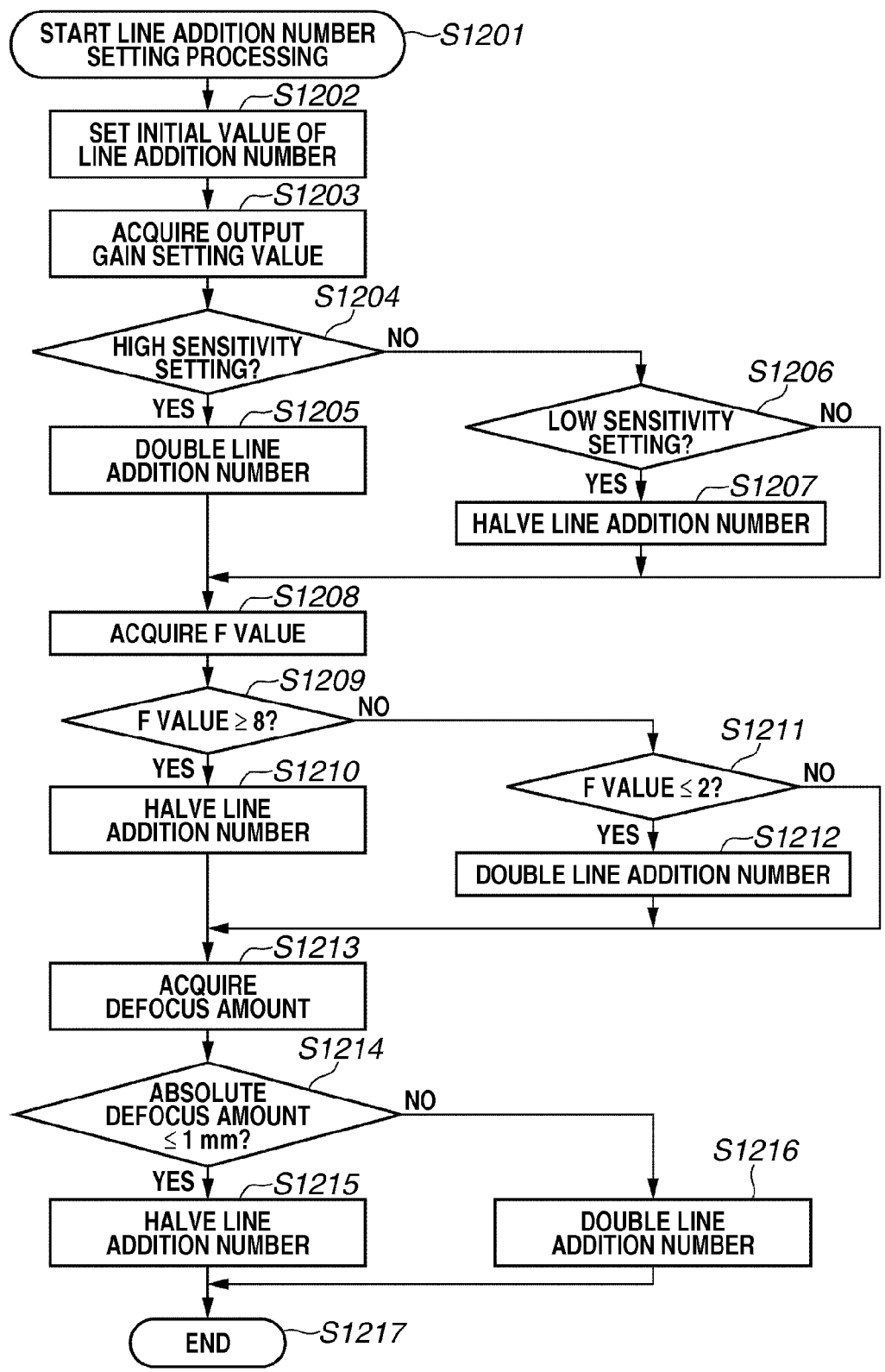
FIG. 12 is a flowchart illustrating a line addition number setting method according to a second exemplary embodiment.

FIG. 12 is a flowchart illustrating a method for setting the number of lines to be added to the focus detection area according to the present exemplary embodiment. The main CPU 151 executes processing in each step illustrated in FIG. 12. In FIG. 12, processing to be performed in steps S1201 and S1202 and processing to be performed in steps S1203 to S1212 are similar to the processing performed in steps S701 and S702 and the processing performed in steps S709 to S718 described in the first exemplary embodiment with reference to FIG. 7.

The main CPU 151 also functions as an addition range setting unit configured to set an addition range composed of a plurality of pixels in the focus detection area.

In step S1213, the main CPU 151 acquires the defocus amount. More specifically, when the imaging apparatus performs a moving image shooting operation or a live view shooting operation, the main CPU 151 repetitively performs the focus detection processing in step S207 illustrated in FIG. 2. Therefore, the defocus amount can be acquired from the previous focus detection result. In step S1214, the main CPU 151 determines whether the absolute value of the acquired defocus amount is equal to or less than 1 mm, more specifically, the main CPU 151 determines whether the current position of the focus lens is close to the in-focus position. If it is determined that the absolute value of the acquired defocus amount is equal to or less than 1 mm (YES in step S1214), then in step S1215, the main CPU 151 halves the line addition number.

On the other hand, if it is determined that the absolute value of the acquired defocus amount is greater than 1 mm (NO in step S1214), then in step S1216, the main CPU 151 doubles the line addition number. Then, in step S1217, the main CPU 151 terminates the processing of the flowchart illustrated in FIG. 12. If the current position of the focus lens is close to the in-focus position, the main CPU 151 performs the focus detection processing while increasing the resolution of the photographic subject. If the current position of the focus lens is far from the in-focus position, the contrast tends to become smaller. Therefore, the main CPU 151 suppresses the amount of noise by increasing the line addition number.

The addition range setting unit sets an addition range to be set when the focusing state is close to the in-focus state to be smaller than an addition range to be set when the focusing state is far from the in-focus state.

As mentioned above, the imaging apparatus according to the present exemplary embodiment performs the line addition number setting processing based on the focus detection result in such a way as to improve the focus detection accuracy in addition to the processing performed according to the method described in the first exemplary embodiment, in which the number of lines to be added to the focus detection area is set based on an exposure setting value.

In each of the above-mentioned exemplary embodiments, the light-receiving portion of a pixel constituting the image sensor 141 is divided into two parts to realize the above-mentioned pupil-dividing function. However, the present invention is not limited to the above-mentioned example. Similar effects can be obtained even when the image sensor is configured to include standard pixels partly replaced by focus detection pixels each having a different pupil and perform focus detection processing based on discrete focus detection images.

A configuration example of the image sensor 141, which includes standard pixels partly replaced by focus detection pixels each having a different pupil, is described in detail below with reference to FIGS. 13A and 13B. Contents similar or identical to those described in FIGS. 3A, 3B, and 3C are denoted by the same reference numerals and redundant description thereof will be avoided.

Figure 13A:
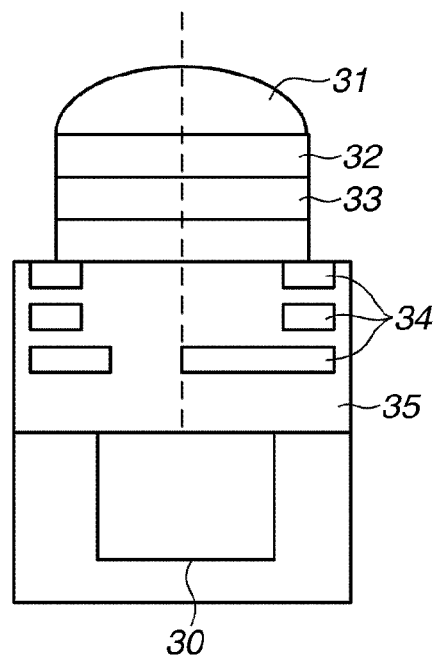
FIGS. 13A and 13B illustrate an image sensor that includes focus detection pixels partly disposed.

FIG. 13A is a cross-sectional view illustrating a focus detection pixel whose light-receiving sensitivity has a sensitivity peak being shifted to the right because of a mask. The on-chip microlens 31 has the capability of efficiently condensing the light onto the photoelectric conversion element 30. According to the example illustrated in FIG. 13A, the focus detection pixel includes an aperture provided at the lowest part of the wiring 34 and shifted to the left in such a way as to realize a pupil-dividing function in which the sensitivity peak is shifted to the right. A color filter 33 of the focus detection pixel is a transparent layer that can transmit a sufficient amount of light. Alternatively, the aperture provided at the lowest part of the wiring 34 can be shifted to the right in such a way as to realize a pupil-dividing function in which the sensitivity peak is shifted to the left.

Figure 13B:
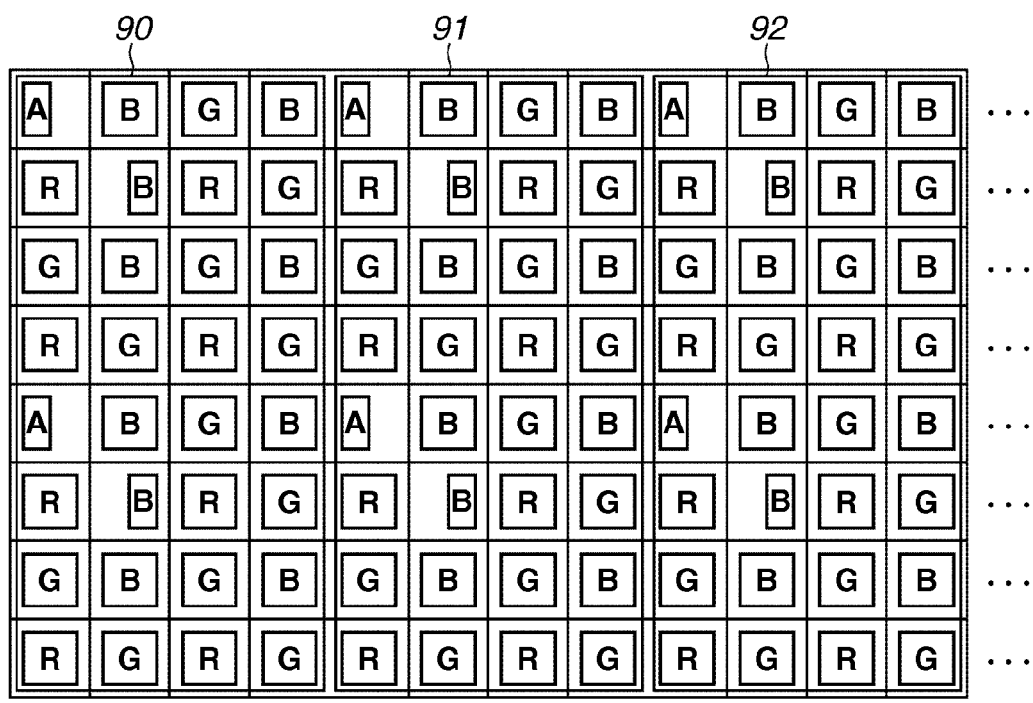

FIG. 13B is a plan view illustrating a part of the image sensor 141. The image sensor 141 includes standard pixels each having an imaging function (i.e., imaging pixels) partly replaced by a focus detection pixel "A" having a sensitivity peak shifted to the right (see the configuration illustrated in FIG. 13A) and a focus detection pixel "B" having a sensitivity peak shifted to the left, which are discretely disposed. Further, red (R), green (G), and blue (B) color filters are alternately disposed on the standard pixels in such a way as to constitute the Bayer array.

In performing the focus detection processing, the imaging apparatus integrates outputs of the photoelectric conversion element corresponding to the focus detection pixel "A" to acquire a focus detection signal of one pixel. Then, the imaging apparatus can generate the image "A" signal by continuously acquiring the above-mentioned signal in the horizontal direction. Similarly, the imaging apparatus integrates outputs of the photoelectric conversion element corresponding to the focus detection pixel "B" to acquire a focus detection signal of one pixel. Then, the imaging apparatus can generate the image "B" signal by continuously acquiring the above-mentioned signal in the horizontal direction. The imaging apparatus generates a pair of phase difference detection signals based on the image "A" signal and the image "B" signal. Thus, when the focus detection images A and B included in pixel blocks 90, 91, and 92 are added, the present invention can be implemented by the image sensor including standard pixels (i.e., imaging pixels) partly replaced by the focus detection pixels each having a different pupil.

Next, a line addition number setting method according to a third exemplary embodiment of the present invention is described in detail below. According to the method described in the above-mentioned exemplary embodiments, the line addition number of the focus detection area is set based on the exposure setting value or the defocus amount. On the other hand, according to the method according to the present exemplary embodiment, the line addition number of the focus detection area is set according to the pixel signal reading mode as described in detail below. Contents similar or identical to those described in the present exemplary embodiment are denoted by the same reference numerals and redundant description thereof will be avoided.

An imaging apparatus according to the present exemplary embodiment is operable according to a pixel signal reading mode selected by the operator via the operation unit 156. The pixel signal reading mode selectable by the operator is, for example, a progressive mode or an interlace mode that corresponds a scanning method of a video output device. The progressive mode is characterized by individually reading signals of all lines without any addition in the vertical direction. Therefore, the resolution is high. However, the frame rate is set to be lower to reduce the processing load. The interlace mode is characterized by reading pixel signals every other line or by adding two lines in the vertical direction. Therefore, compared to the progressive mode, the resolution becomes lower and the frame rate can be increased.

The image sensor according to the present exemplary embodiment outputs signals to be used by the focus detection unit and the imaging unit. Therefore, an image signal obtainable by the focus detection unit is significantly influenced by the reading mode. If the same line addition number is set in both of the progressive mode and the interlace mode, the substantial focus detection area in the vertical direction is doubled when the interlace mode is set because two lines are regarded as one line. In a case where a photographic subject is obliquely positioned in the focus detection area, the resolution may deteriorate significantly. In such a case, it is feasible to secure the resolution in the vertical direction while maintaining the size of the focus detection area by controlling the line addition number according to the pixel signal reading mode.

Figure 14:
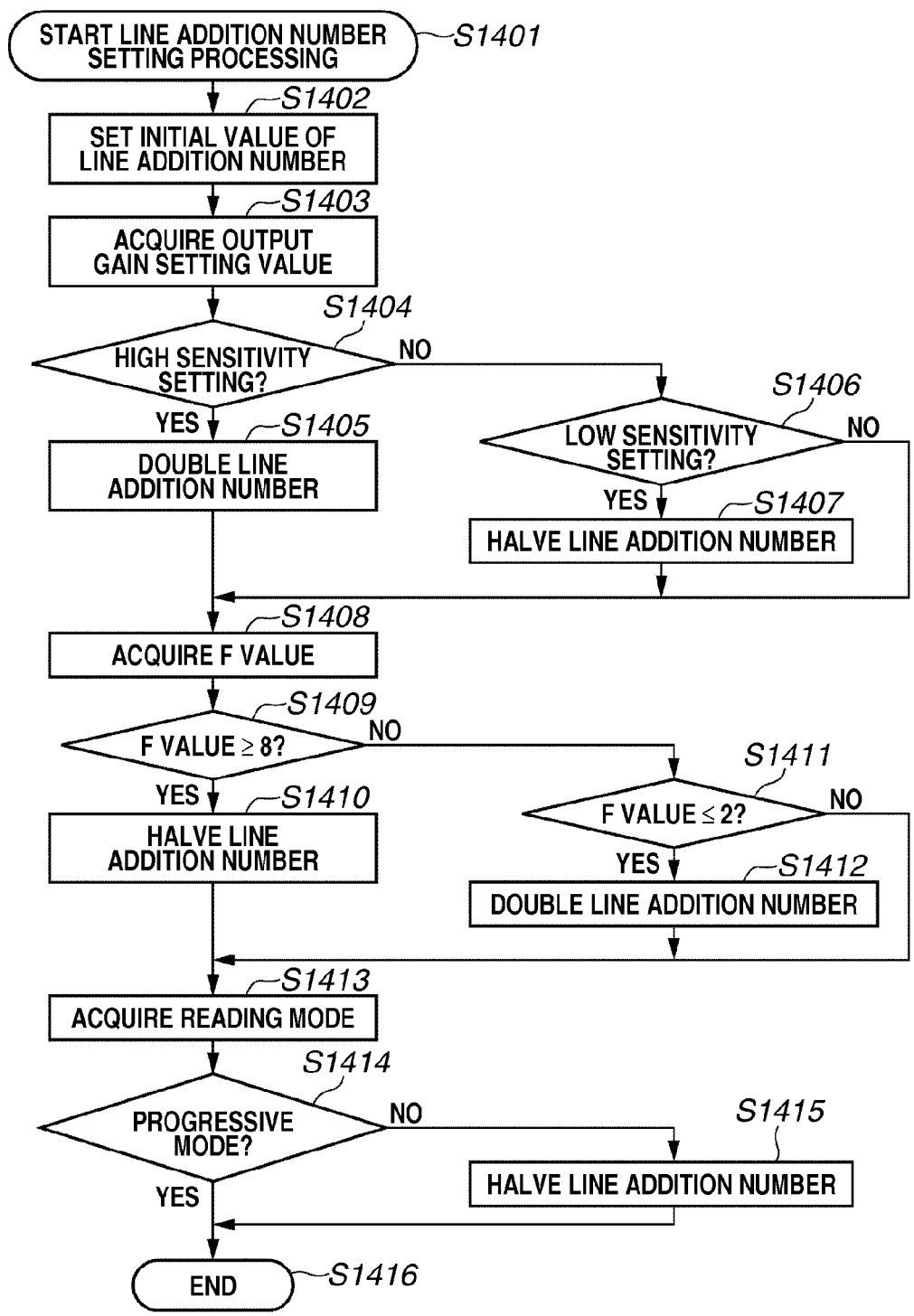
FIG. 14 is a flowchart illustrating a line addition number setting method according to a third exemplary embodiment.

FIG. 14 is a flowchart illustrating a method for setting the number of lines to be added to the focus detection area according to the present exemplary embodiment. The main CPU 151 executes processing in each step illustrated in FIG. 14. In FIG. 14, processing to be performed in steps S1401 and S1402 and processing to be performed in steps S1403 to S1412 are similar to the processing performed in steps S701 and S702 and the processing performed in steps S709 to S718 described in the first exemplary embodiment with reference to FIG. 7.

The main CPU 151 functions as an addition range setting unit configured to set an addition range composed of a plurality of pixels in the focus detection area.

In step S1413, the main CPU 151 acquires the pixel signal reading mode. In step S1414, the main CPU 151 confirms whether the pixel signal reading mode is the progressive mode. If it is determined that the pixel signal reading mode is the progressive mode (YES in step S1414), the operation proceeds to step S1416. If it is determined that the pixel signal reading mode is not the progressive mode (NO in step S1414), then in step S1415, the main CPU 151 halves the line addition number. Then, in step S1416, the main CPU 151 terminates the processing in the flowchart illustrated in FIG. 14.

As mentioned above, the imaging apparatus according to the present exemplary embodiment performs the line addition number setting processing based on the pixel signal reading mode in addition to the processing performed according to the method described in the first exemplary embodiment, in which the number of lines to be added to the focus detection area is set based on the exposure setting value. Therefore, it is feasible to secure the resolution in the vertical direction while maintaining the size of the focus detection area.

Although the above-mentioned exemplary embodiment has been described based on the progressive mode and the interlace mode, the present invention is not limited to the above-mentioned example. In the pixel signal reading processing, it is also useful to change the number of lines to be added to the focus detection area according to the number of lines to be thinned out or added in the vertical direction.

Although the above-mentioned method uses an arithmetic means in the line addition, the present invention is not limited to the above-mentioned example. For example, it is useful to simply add the lines when a signal obtained by the addition unit is less than a predetermined value.

According to each of the above-mentioned exemplary embodiments, the number of lines to be added to the focus detection area is set based on the exposure setting value or the focus detection result in a focus detection apparatus that can perform imaging and focus detection processing using photoelectric conversion portions each having the above-mentioned pupil-dividing function. Thus, it is feasible to reduce the amount of noise and suppress the dispersion of focus detection result. Further, it is feasible to secure the resolution in the vertical direction and prevent the detection accuracy from deteriorating. Therefore, according to each of the above-mentioned exemplary embodiments, it is feasible to perform the focus detection processing using image signals each including a lesser amount of noise. Thus, the present invention can provide a highly accurate focus detection apparatus, an imaging apparatus, an imaging system, and a focus detection method.

The present invention is not limited to the above-mentioned exemplary embodiments. The exemplary embodiments can be modified in various ways within the scope of the present invention.

The present invention provides an imaging apparatus that can perform focus detection processing using image signals each including a lesser amount of noise and can realize the focus detection processing accurately.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-010206 filed Jan. 23, 2013 and No. 2013-228322 filed Nov. 1, 2013, which are hereby incorporated by reference herein in their entirety.

What is claimed is:

1. An imaging apparatus comprising:
an image sensor;
a focus detection unit configured to perform a focus detecting operation according to a phase difference detection method using a pair of light fluxes having passed though different exit pupils of a photographic optical system and detected by the image sensor;
an addition unit configured to add outputs of a plurality of pixels positioned in a focus detection area selected in the image sensor;
an addition range setting unit configured to set an addition range of the plurality of pixels positioned in the focus detection area;
a defocus amount calculation unit configured to calculate a defocus amount based on an image shift amount obtained by the addition unit; and
a focus adjustment unit configured to perform a focus adjusting operation using the defocus amount,
wherein the addition range setting unit is configured to change the addition range based on an exposure setting value of the photographic optical system or the image sensor, wherein the exposure setting value is an aperture diameter of a diaphragm included in the photographic optical system, and
wherein the addition range setting unit is configured to set the addition range larger than a threshold when the diaphragm aperture diameter is larger than a predetermined value and to set the addition range smaller than the threshold when the diaphragm aperture diameter is smaller than the predetermined value.

2. The imaging apparatus comprising:
an image sensor;
a focus detection unit configured to perform a focus detecting operation according to a phase difference detection method using a pair of light fluxes having passed though different exit pupils of a photographic optical system and detected by the image sensor;
an addition unit configured to add outputs of a plurality of pixels positioned in a focus detection area selected in the image sensor;
an addition range setting unit configured to set an addition range of the plurality of pixels positioned in the focus detection area;
a defocus amount calculation unit configured to calculate a defocus amount based on an image shift amount obtained by the addition unit; and
a focus adjustment unit configured to perform a focus adjusting operation using the defocus amount,
wherein the addition range setting unit is configured to change the addition range based on an exposure setting value of the photographic optical system or the image sensor, wherein the exposure setting value is a storage time of the image sensor, and
wherein the addition range setting unit is configured to set the addition range larger than a threshold when the storage time of the image sensor is shorter than a predetermined value and to set the addition range smaller than the threshold when the storage time of the image sensor is longer than the predetermined value.

3. The imaging apparatus comprising:
an image sensor;
a focus detection unit configured to perform a focus detecting operation according to a phase difference detection method using a pair of light fluxes having passed though different exit pupils of a photographic optical system and detected by the image sensor;
an addition unit configured to add outputs of a plurality of pixels positioned in a focus detection area selected in the image sensor;
an addition range setting unit configured to set an addition range of the plurality of pixels positioned in the focus detection area;
a defocus amount calculation unit configured to calculate a defocus amount based on an image shift amount obtained by the addition unit; and
a focus adjustment unit configured to perform a focus adjusting operation using the defocus amount,
wherein the addition range setting unit is configured to change the addition range based on an exposure setting value of the photographic optical system or the image sensor, wherein the exposure setting value is an output gain value of the image sensor, and
wherein the addition range setting unit is configured to set the addition range larger than a threshold when the output gain value is larger than a predetermined value and to set the addition range smaller than the threshold when the output gain value is smaller than the predetermined value.

4. The imaging apparatus comprising:
an image sensor;
a focus detection unit configured to perform a focus detecting operation according to a phase difference detection method using a pair of light fluxes having passed though different exit pupils of a photographic optical system and detected by the image sensor;

an addition unit configured to add outputs of a plurality of pixels positioned in a focus detection area selected in the image sensor;

an addition range setting unit configured to set an addition range of the plurality of pixels positioned in the focus detection area;

a defocus amount calculation unit configured to calculate a defocus amount based on an image shift amount obtained by the addition unit; and a focus adjustment unit configured to perform a focus adjusting operation using the defocus amount, wherein the addition range setting unit is configured to change the addition range based on an exposure setting value of the photographic optical system or the image sensor, wherein the exposure setting value is a target exposure value based on a gamma correction, and wherein the addition range setting unit is configured to set the addition range smaller than a threshold when the target exposure value is larger than a predetermined value and to set the addition range larger than the threshold when the target exposure value is smaller than the predetermined value.

5. An imaging apparatus comprising:
an image sensor;
a focus detection unit configured to perform a focus detecting operation according to a phase difference detection method using a pair of light fluxes having passed through different exit pupils of a photographic optical system and detected by the image sensor;

an addition unit configured to add outputs of a plurality of pixels positioned in a focus detection area selected in the image sensor;

an addition range setting unit configured to set an addition range of the plurality of pixels positioned in the focus detection area;

a defocus amount calculation unit configured to calculate a defocus amount based on an image shift amount obtained by the addition unit; and a focus adjustment unit configured to perform a focus adjusting operation using the defocus amount, wherein the addition range setting unit is configured to change the addition range based on the defocus amount.

6. The imaging apparatus according to claim 5, further comprising an in-focus state determination unit configured to determine a focusing state of a focus detection result obtained based on the defocus amount, wherein the addition range setting unit is configured to adjust the addition range to be set in a case where the focusing state is close to an in-focus state to be smaller than the addition range to be set in a case where the focusing state is far from the in-focus state.

7. A method of operating an imaging processing apparatus that includes an image sensor comprising:
performing a focus detecting operation according to a phase difference detection method using a pair of light fluxes having passed though different exit pupils of a photographic optical system and detected by the image sensor;

adding outputs of a plurality of pixels positioned in a focus detection area selected in the image sensor;

setting an addition range of the plurality of pixels positioned in the focus detection area;

calculating a defocus amount based on an image shift amount obtained by the addition unit; and performing a focus adjusting operation using the defocus amount, changing the addition range based on an exposure setting value of the photographic optical system or the image sensor, wherein the exposure setting value is an aperture diameter of a diaphragm included in the photographic optical system, and setting the addition range larger than a threshold when the diaphragm aperture diameter is larger than a predetermined value and to set the addition range smaller than the threshold when the diaphragm aperture diameter is smaller than the predetermined value.

8. A method of operating an imaging processing apparatus that includes an image sensor comprising:
performing a focus detecting operation according to a phase difference detection method using a pair of light fluxes having passed though different exit pupils of a photographic optical system and detected by the image sensor;

adding outputs of a plurality of pixels positioned in a focus detection area selected in the image sensor;

setting an addition range of the plurality of pixels positioned in the focus detection area;

calculating a defocus amount based on an image shift amount obtained by the addition unit; and performing a focus adjusting operation using the defocus amount, changing the addition range based on an exposure setting value of the photographic optical system or the image sensor, wherein the exposure setting value is a storage time of the image sensor, and setting the addition range larger than a threshold when the storage time of the image sensor is shorter than a predetermined value and to set the addition range smaller than the threshold when the storage time of the image sensor is longer than the predetermined value.

9. A method of operating an imaging processing apparatus that includes an image sensor comprising:
performing a focus detecting operation according to a phase difference detection method using a pair of light fluxes having passed though different exit pupils of a photographic optical system and detected by the image sensor;

adding outputs of a plurality of pixels positioned in a focus detection area selected in the image sensor;

setting an addition range of the plurality of pixels positioned in the focus detection area;

calculating a defocus amount based on an image shift amount obtained by the addition unit; and performing a focus adjusting operation using the defocus amount, changing the addition range based on an exposure setting value of the photographic optical system or the image sensor, wherein the exposure setting value is an output gain value of the image sensor, and setting the addition range larger than a threshold when the output gain value is larger than a predetermined value and to set the addition range smaller than the threshold when the output gain value is smaller than the predetermined value.

10. A method of operating an imaging processing apparatus that includes an image sensor comprising:
performing a focus detecting operation according to a phase difference detection method using a pair of light fluxes having passed though different exit pupils of a photographic optical system and detected by the image sensor;

adding outputs of a plurality of pixels positioned in a focus detection area selected in the image sensor;

setting an addition range of the plurality of pixels positioned in the focus detection area;

calculating a defocus amount based on an image shift amount obtained by the addition unit; and performing a focus adjusting operation using the defocus amount, changing the addition range based on an exposure setting value of the photographic optical system or the image sensor, wherein the exposure setting value is a target exposure value based on a gamma correction, and setting the addition range smaller than a threshold when the target exposure value is larger than a predetermined value and to set the addition range larger than the threshold when the target exposure value is smaller than the predetermined value.

11. A method of operating an imaging processing apparatus that includes an image sensor comprising:

performing a focus detecting operation according to a phase difference detection method using a pair of light fluxes having passed through different exit pupils of a photographic optical system and detected by the image sensor;

adding outputs of a plurality of pixels positioned in a focus detection area selected in the image sensor;

setting an addition range of the plurality of pixels positioned in the focus detection area;

calculating a defocus amount based on an image shift amount obtained by the addition unit; and performing a focus adjusting operation using the defocus amount, changing the addition range based on the defocus amount.

* * * * *